(12) United States Patent
Terasaka et al.

(10) Patent No.: US 10,456,961 B2
(45) Date of Patent: Oct. 29, 2019

(54) BONDING APPARATUS AND BONDING METHOD

(71) Applicant: MITSUBISHI HEAVY INDUSTRIES, LTD., Tokyo (JP)

(72) Inventors: Akihiro Terasaka, Tokyo (JP); Jun Eto, Tokyo (JP); Yasunobu Ishida, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 277 days.

(21) Appl. No.: 15/507,757

(22) PCT Filed: Nov. 25, 2015

(86) PCT No.: PCT/JP2015/083112
§ 371 (c)(1),
(2) Date: Feb. 28, 2017

(87) PCT Pub. No.: WO2016/084861
PCT Pub. Date: Jun. 2, 2016

(65) Prior Publication Data
US 2017/0305044 A1 Oct. 26, 2017

(30) Foreign Application Priority Data
Nov. 25, 2014 (JP) .................... 2014-238073

(51) Int. Cl.
*B32B 37/00* (2006.01)
*B29C 43/12* (2006.01)
(Continued)

(52) U.S. Cl.
CPC .......... *B29C 43/12* (2013.01); *B29C 43/3642* (2013.01); *B29C 65/02* (2013.01);
(Continued)

(58) Field of Classification Search
USPC ........................................ 156/580
See application file for complete search history.

(56) References Cited

U.S. PATENT DOCUMENTS

| 5,015,168 A | 5/1991 | Boime et al. |
| 6,149,749 A * | 11/2000 | McBroom ............... B29C 73/02 |
| | | 156/87 |

(Continued)

FOREIGN PATENT DOCUMENTS

| EP | 2371523 A1 | 10/2011 |
| JP | 2008-531337 A | 8/2008 |

(Continued)

OTHER PUBLICATIONS

Extended European Search Report in EP application No. 15863240.6, dated Aug. 4, 2017. 9pp.

(Continued)

*Primary Examiner* — James D Sells
(74) *Attorney, Agent, or Firm* — Kanesaka Berner and Partners, LLP

(57) ABSTRACT

The bonding apparatus of the present invention is an apparatus that bonds a patch containing a reinforcing fiber to a bonded section of a corner section CR of an object member. The bonding apparatus has s heater mat, a pushing member, a bag member having a decompression port, a mold releasing film, a breather, a heater mat and a sealant. A pushing member has a first cowl plate, a second cowl plate and an elastic pressuring body. A pressuring section of the pushing member has the surface shape corresponding to a corner section design value after the patch is bonded. By protruding from a gap between a first cowl plate and a second cowl plate to a direction of the corner section CR, the patch is pushed to the bonded section and the generation of a wrinkle in the reinforcing fiber can be prevented.

8 Claims, 7 Drawing Sheets

(51) Int. Cl.
  *B29C 73/12*     (2006.01)
  *B29C 65/48*     (2006.01)
  *B29C 65/00*     (2006.01)
  *B29C 65/02*     (2006.01)
  *B29C 65/78*     (2006.01)
  *B29C 70/06*     (2006.01)
  *B29C 73/32*     (2006.01)
  *B29C 43/36*     (2006.01)
  *B29C 65/18*     (2006.01)
  *B29C 73/02*     (2006.01)

(52) U.S. Cl.
  CPC .......... *B29C 65/48* (2013.01); *B29C 65/7841* (2013.01); *B29C 66/0044* (2013.01); *B29C 66/1122* (2013.01); *B29C 66/5326* (2013.01); *B29C 66/721* (2013.01); *B29C 66/81417* (2013.01); *B29C 66/81455* (2013.01); *B29C 70/06* (2013.01); *B29C 73/12* (2013.01); *B29C 73/32* (2013.01); *B29C 65/18* (2013.01); *B29C 65/4815* (2013.01); *B29C 65/4835* (2013.01); *B29C 65/78* (2013.01); *B29C 66/7392* (2013.01); *B29C 66/7394* (2013.01); *B29C 66/73751* (2013.01); *B29C 73/025* (2013.01); *B29C 2043/3644* (2013.01)

(56) References Cited

U.S. PATENT DOCUMENTS

| | | | |
|---|---|---|---|
| 8,444,127 | B2 | 5/2013 | Watson et al. |
| 8,734,711 | B2 | 5/2014 | Lengsfeld et al. |
| 8,790,485 | B2 | 7/2014 | Whitworth et al. |
| 8,894,784 | B2 | 11/2014 | Watson et al. |
| 9,108,395 | B2 | 8/2015 | Whitworth et al. |
| 2003/0188821 | A1* | 10/2003 | Keller .................... B29C 43/12 156/94 |
| 2006/0191624 | A1 | 8/2006 | Whitworth et al. |
| 2008/0308210 | A1 | 12/2008 | Keller et al. |
| 2010/0314807 | A1 | 12/2010 | Lengsfeld et al. |
| 2011/0139344 | A1 | 6/2011 | Watson et al. |
| 2012/0061006 | A1 | 3/2012 | Marquardt |
| 2012/0080135 | A1 | 4/2012 | Evens et al. |
| 2013/0164481 | A1 | 6/2013 | Whitworth et al. |
| 2013/0228275 | A1 | 9/2013 | Watson et al. |
| 2014/0299255 | A1 | 10/2014 | Whitworth et al. |

FOREIGN PATENT DOCUMENTS

| | | |
|---|---|---|
| JP | 2009148952 A | 7/2009 |
| JP | 2011-507738 A | 3/2011 |
| JP | 2013-513499 A | 4/2013 |

OTHER PUBLICATIONS

Written Opinion in PCT Application No. PCT/JP2015/083112, dated Feb. 16, 2016.
International Search Report in PCT Application No. PCT/JP2015/083112, dated Feb. 16, 2016.
Office Action for Chinese Application No. 201580041094.X dated May 31, 2019; 12pp.

\* cited by examiner

BONDING APPARATUS AND BONDING METHOD

RELATED APPLICATIONS

The present application is a National Phase of International Application No. PCT/JP2015/083112, filed Nov. 25, 2015, and claims priority based on Japanese Patent Application No. 2014-238073, filed Nov. 25, 2014.

TECHNICAL FIELD

The present invention relates to a bonding apparatus and a bonding method, that are used when a patch is bonded to the inside of a corner of an object member (hereinafter, to be referred to as a corner section) and to a concave section.

BACKGROUND ART

Conventionally, Patent Literature 1 (JP 2008-531337A) discloses a method of repairing a composite material by using a folding type of vacuum bag and a heating device without carrying out an autoclave treatment in which thermoforming is carried out in a pressure resistant vessel. According to a method of repairing a single vacuum reducing composite panel described in Patent Literature 1, it becomes possible to repair the composite material containing the reinforcing fiber, in a parking apron of a helicopter.

In the method of repairing the single vacuum reducing composite panel described in Patent Literature 1, a stacked layer of fiber in which an impregnation has been previously carried out with a resin is formed, the stacked layer is heated at a first temperature, and the resin is cured through the decompression. The impregnated stacked layer that has been deaerated, is arranged on the region of the composite material of the repair object. The impregnated stacked layer is heated at a second temperature, and decompressed, and the impregnated stacked layer is cured on the region of the repair object.

Also, Patent Literature 2 (US 2012/0080135) discloses a method of repairing the structure of a fuselage having a plane or a curved surface on the fuselage by a double vacuum debulking system.

The double vacuum debulking system described in Patent Literature 2 includes an external covering bag film disposed to cover the region of the repair object, a strong bag support tool arranged between the external bag film and a parent structure; a spacer disposed to keep a constant space between the parent structure and the strong bag support tool; a first vacuum probe that is connected with a vacuum source; and a heating blanket. The shape of the strong bag support tool has the contour that coincides with the contour of the parent structure.

Also, Patent Literature 3 (US 2008/0308210) discloses the invention relating to a determining process of parameters in a pretreatment process of repair composite material patch using a double vacuum bag process.

Also, Patent Literature 4 (US 2013/0164481) discloses a method of repairing a damaged composite part having an exposed surface.

In a manufacturing method of a stacked layer body that is produced from polymer matrix composite material disclosed in Patent Literature 4, a peeling film is arranged on the surface of a damaged composite material, an un-curing stack assembly is formed to conform to the contour of the surface of the damaged composite material, and heating at a temperature below a curing temperature while sucking. After that, the un-curing stack assembly is removed, adhesive material is applied on the exposed surface of the damaged composite material and then the un-cured stack assembly is arranged again, and the stack assembly is cured while compressing.

CITATION LIST

[Patent Literature 1] JP 2008-531337A
[Patent Literature 2] US 2012/0080135
[Patent Literature 3] US 2008/0308210
[Patent Literature 4] US 2013/0164481

SUMMARY OF THE INVENTION

According to the method of repairing the composite material described in Patent Literatures 1-4, the repair is possible to add a reinforcing fiber to a surface and a convex section of the repair object member. However, when applying the repairing method of the composite material described in Patent Literatures 1-4 is applied to an application in which the reinforcing fiber is added to a corner section and a concave section of the repair object member, the strength of the structure material is sometimes declined after the repairing.

The present invention has as an object, to provide a bonding apparatus and a bonding method, in which a patch containing a reinforcing fiber is bonded to the corner section and the concave section of the object member.

The bonding apparatus that bonds a patch containing a reinforcing fiber, to a bonded section on a surface portion of a corner section of an object member. The bonding apparatus includes: a pushing member and a biasing section. The pushing member is disposed to push a surface of the bonded patch in response to an application force. The biasing section is disposed to give the application force to the pushing member.

The pushing member includes: a first plate section disposed to extend along the object member from the corner section to a first direction; and a second plate section disposed to extend along the object member from the corner section to a second direction different from the first direction. The object member is pushed with the first plate section and the second plate section in response to the application force.

The pushing member includes: a first plate section disposed to extend along the object member from the corner section to a first direction; a second plate section disposed to extend along the object member from the corner section to a second direction different from the first direction; and an elastic pressuring body disposed to push the corner section through a gap between the first plate section and the second plate section. The elastic pressuring body has a pressure receiving surface to which the application force is given, and a pressuring section that pushes the corner section through the gap between the first plate section and the second plate section in response to the application force.

The elastic pressuring body has Durometer hardness in a range of 10 to 55.

The elastic pressuring body is added with a high thermal transmission material.

The bonding apparatus further includes: a heating unit disposed to heat the patch; and a bag member disposed to cover the surface portion containing the bonded section of the object member, the patch, the heating unit, and the pushing member. The application force can use an atmosphere pressure that acts to the pressure receiving surface through the bag member.

The bonding apparatus further includes: a heating unit disposed to heat the patch; and a bag member disposed to cover the surface portion containing the bonded section of the object member, the patch, the heating unit and pushing member. The inside of the bag member is decompressed. The biasing section is arranged outside a closed space formed from the bag member and the object member to bias the pushing member for the patch.

The biasing section has a bias force giving member that applies pressuring force along a third direction. The third direction is a direction to which the pressuring section biased for the corner section and a component force to the third direction includes a component force of a direction to bias a first plate section for the patch and a component force of the direction to bias a second plate section for the patch.

The biasing section further includes an inclination block and a sliding block. The inclination block has a sliding slope to make the sliding block and the giving member slide to a third direction along the sliding slope. The sliding block slides along the sliding slope to convert a clamp force in a direction different from a third direction to the application force in the third direction to transfer to the biasing force giving member. The biasing force giving member applies the pressuring force to the pushing member through the bag member by sliding along the sliding slope.

The inclination block, the sliding block and the giving member are arranged on a side of the bonded section of the object member. The biasing section further comprises a back block arranged on a back side of the bonded section of the object member to apply the clamp force.

A bonding method using the bonding apparatus according to the present invention is a method of bonding a patch containing a reinforcing fiber to a bonded section of a surface portion in a corner section of an object member. The bonding method of the present invention includes preparing a bag member having a decompression port, a heating unit and a pushing member pushing a surface of the patch; arranging the patch in the bonded section of the corner section of the object member; disposing the pushing member toward the bonded section of the corner section; arranging the pushing member for the pressuring section to come into contact with the bonded section of the corner section; and forming a closed space from the bag member and the object member, such that the patch, the heating unit, and the pushing member are arranged in the closed space.

Also, through the decompression port, the bonding method includes deaerating gas in the closed space and pushing the pressuring section of the pushing member for the corner section through the patch. The object member and the patch are heated and bonded by a heating unit.

The pushing member according to the present invention is a member pushing a patch containing a reinforcing fiber to a bonded section in a corner section of an object member. The pushing member has a first plate section, a second plate section and an elastic pressuring body. The first plate section and the second plate section are arranged on both sides of put the corner section of the object member between plate sections at angles different from each other and a gap corresponding to the corner section is provided between the first plate section and the second plate section.

The elastic pressuring body is arranged to extend over the first plate section and the second plate section between the first plate section and the second plate section. Also, the elastic pressuring body has a pressure receiving surface to which the pushing force is given, on an opposite side to the gap. The elastic pressuring body has a pressuring section receiving the pushing force and protrudes from the gap to the direction of the corner section of the object member, to push the patch to the bonded section.

A biasing section according to the present invention pushes a patch containing a reinforcing fiber to a bonded section in a corner section of an object member. The biasing section has a first biasing force giving section, a second biasing force giving section and a biasing force giving member. The biasing force giving member has a pressuring section at the tip. The first biasing force giving section and the second biasing force giving section apply a clamp force to clamp the biasing force giving member and the object member. Then, the biasing force giving member extends to the direction of the corner section of the object member based on the clamp force, so that the pressuring section pushes the patch to the bonded section.

A biasing unit of the present invention includes an inclination block, a sliding block and a back block. The inclination block, the sliding block and a biasing force giving member are arranged on the side of the bonded section of the object member. The back block is arranged on the back side of the bonded section of the object member. The inclination block has a sliding slope to make the sliding block and the biasing force giving member slide for a third direction. The sliding block slides along the sliding slope, to convert a clamp force in a direction different from the third direction into the pressuring force to the third direction, to communicate to the biasing force giving member. The biasing force giving member slides along the sliding slope so that the pressuring section pushes the patch to the bonded section.

By using the bonding apparatus, the kit, the pushing member, the biasing unit and the bonding method according to the present invention, the patch containing the reinforcing fiber can be effectively pushed to the corner section and the concave section of the object member and the generation of a wrinkle can be decreased.

DESCRIPTION OF THE EMBODIMENTS

Figure 8:
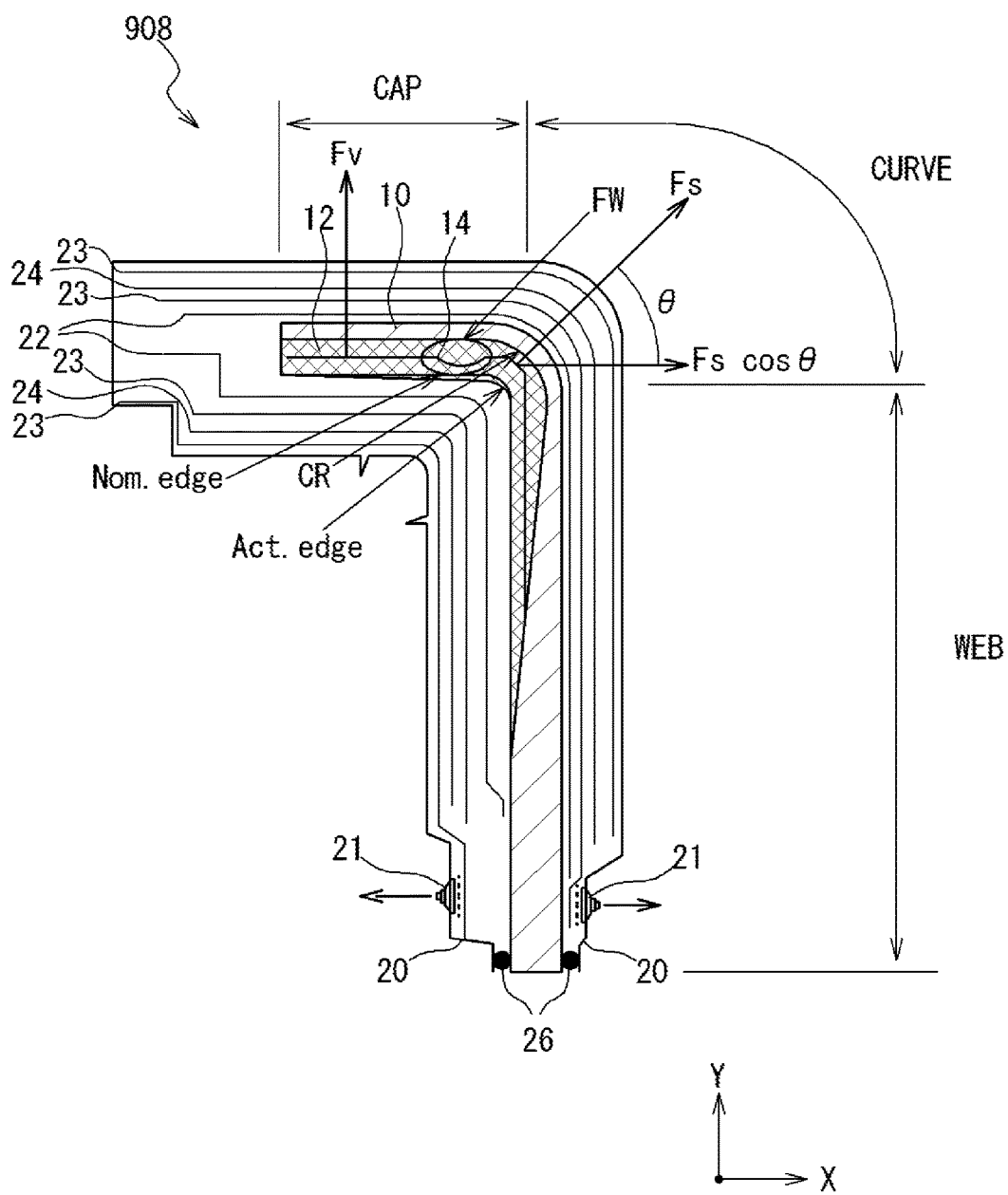
FIG. 8 is a side view showing the situation that the pressure shaping is carried out by bonding the reinforcing fiber to the corner section of the object member of the L-shaped material.

The subject matter recognized about the techniques known to the inventors of the present invention will be described with reference to FIG. 8. FIG. 8 is a side view showing the situation that a reinforcing fiber is bonded to a corner section of an L-shaped object member 10 as a target by a bonding apparatus 908.

Referring to FIG. 8, the bonding apparatus 908 is used when a patch 12 containing reinforcing fiber 14 and a matrix resin is bonded to a bonded section at a corner section CR of a CURVE section (bent section) of an object member 10.

The bonding apparatus 908 has a bag member 20, a decompression port 21, a mold releasing film 22, a breather 23, a heater mat 24 and a sealant 26. The object member 10 has a standing WEB section (a section extending to one direction from the bent section in an example shown in FIG. 8) and a CAP section (a section extending to another direction from the bent section and a vertex section in an example shown in FIG. 8) that has a predetermined angle to the WEB section. The CURVE section is a section between the WEB section and the CAP section.

The bag member 20 is the member that covers the patch 12 from the outside in the condition that the patch 12 is arranged to the bonded section of the corner section of the object member 10 and has airtightness. The bag member 20 pushes the patch 12 to the object member 10 by using an external pressure (e.g. atmosphere pressure).

The decompression port 21 is used to connect the inside of the bag member 20 and a vacuum pump (not shown). A gas existing in a closed space inside the bag member 20 is evacuated through the decompression port 21, and the inside of the bag member 20 is decompressed. Thus, the external pressure pushes the bag member 20 from outside so as to push the patch 12 to the object member 10.

The mold releasing film 22 having a peel property to the matrix resin is contained in the patch 12, and so on and is used to cover the patch 12 and the object member 10 directly.

The breather 23 is a member to promote deaeration inside the bag member 20. For example, the breather 23 is a breathable film.

The heater mat 24 is a device to heat the patch 12. When the matrix resin of the patch 12 is a thermosetting resin, the curing of the patch 12 and adhesion to the object member 10 are carried out through the heating. The heater mat 24 may contain a heater generating heat with power from a power supply.

The sealant 26 is arranged between the bag member 20 and the object member 10 to secure airtightness between the outside of the bag member 20 and the inside of the bag member 20.

Next, a method of bonding the patch 12 to the bonded section in the corner section of the object member 10 will be described.

First, a cutting-out process is carried out according to need to the bonded section of the object member 10 to remove a damage part and so on.

Next, the patch 12 containing the reinforcing fiber 14 is arranged on the surface of the bonded section of the object member 10. Then, the mold releasing film 22, the breather 23, the heater mat 24 and the breather 23 are arranged in this order on the surface of the patch 12 and the object member 10. Then, the sealant 26 is arranged and the decompression port 21 and the vacuum pump are connected, and then the inside of the bag member 20 is decompressed and deaerated. Note that when the reinforcing fiber 14 of a dry form type of the patch 12 is used, the matrix resin may be applied to the dry form previously, or, the matrix resin may be injected inside the bag member 20 while decompressing the inside of the bag member 20. Thus, the matrix resin can be impregnated into the reinforcing fiber 14.

Next, power is supplied to the heater mat 24 so as to heat the patch 12 and the object member 10. After the heating is carried out for a predetermined time, the inside of the bag member 20 is returned to the external pressure after cooling, and the bag member 20, the mold releasing film 22, the breather 23 and the heater mat 24 are removed from the object member 10.

As a result of experiments to bond the patch 12 to the object member 10 by using the bonding apparatus 908 shown in FIG. 8, there is a phenomenon that the patch is cured in the condition protruding from a corner section design value (Nom.edge) in a final shape (Act.edge) of an end of the corner section after the patch 12 is bonded.

Also, as shown in FIG. 8, a phenomenon was seen in which a wrinkle and sag are caused in the reinforcing fiber 14 of the CURVE section and the CAP section of the object member 10. Especially, it is easy for the wrinkle to generate in the wrinkle generation section FW of the CAP section.

On the other hand, when the patch 12 is bonded to a flat plate not having the CURVE section as shown in FIG. 8, the generation of any wrinkle was not seen even if the patch 12 was bonded in the same condition. From this, it is concluded that any wrinkle is easy to generate at a wrinkle generation section FW shown in FIG. 8 in the CURVE section of the object member 10 and around it. Especially, it is concluded that a generation frequency is high in the CAP section in the neighborhood of the CURVE section.

Especially, in the embodiment shown in FIG. 8, there is a tendency that the wrinkle is easy to generate in the CAP section (the wrinkle generation section FW) which is in a side direction of the corner section CR where the patch 12 is easy to hang with the weight. When the object member 10 is a single article of a small channel member, it is possible to try to reduce the generation of the wrinkle by changing the relation of the direction of the bonded section and the direction of the weight by changing the attitude of the object member 10 (turned and so on). However, in case where the structural section of an aircraft parked in an apron is repaired, it is very difficult to change the relation of the direction of the weight and the direction of the bonded section.

The reason why the generation frequency of the wrinkle is high in the wrinkle generation section FW shown in FIG. 8 is in that the reinforcing fiber 14 of the patch 12 is difficult to slide near the wrinkle generation section FW. It is considered that a wrinkle caused in the reinforcing fiber 14 does not stretched because the reinforcing fiber 14 is difficult to slide, and the reinforcing fiber 14 is cured in the condition that sag is caused so that the wrinkle is caused in the reinforcing fiber 14.

As a cause that the reinforcing fiber 14 of the patch 12 is difficult to slide smoothly in the wrinkle generation section FW, it is considered that the reinforcing fiber 14 is pushed with a force Fv (N) in a perpendicular direction (+Y direction shown in FIG. 8) to the CAP section by decompressing the inside of the bag member 20, so that a frictional force •Fv (N) is generated between the reinforcing fiber 14 and the object member 10. The reinforcing fiber 14 is difficult to slide to the X direction shows in FIG. 8 due to the frictional force •Fv. As a result, a wrinkle is left in the wrinkle generation section FW so that the wrinkle becomes easy to generate.

On the other hand, the force to prevent the generation of the wrinkle when the reinforcing fiber 14 of the patch 12 is slid to the X direction shown in FIG. 8 in the CAP section is generated from a +X component (Fs×cos θ) of a force Fs (N) pushing the corner section CR to a diagonal direction between the +X direction and the +Y direction (for example, angle θ=45° to the X direction). The force Fs pushing to the diagonal direction is obtained from the pushing force applied to the surface of the bag member 20 by decompressing the inside of the bag member 20. However, it can be considered that the force Fs pushing in the diagonal direction reduces due to the frictional force among the bag member 20, the mold releasing film 22 and the heater mat 24. Therefore, it can be considered that the pushing force in the +X direction to the reinforcing fiber 14 of the patch 12 is lacking at the wrinkle generation section FW so that the reinforcing fiber 14 is cured without extending the wrinkle and the wrinkle becomes easy to generate.

In this case, for example, when the length in the X direction of the CAP section of the patch 12 is X=2.54 (cm), the length in the depth direction shown in FIG. 8 is Z=20 (cm), the friction coefficient between the reinforcing fibers 14 is •=0.3, and the external pressure (the atmosphere pressure) P=0.1013 (MPa) is applied to the bag member 20, it is possible to expect that the generation of the wrinkle can be prevented in some degree if the force Fs pushing diagonally is Fs •222 (N). Therefore, considering the margin of 1.5 times, an experiment was carried out in which the pushing force of 350 (N) from the outside of the bag member 20 is applied to the diagonal direction in the +X direction and the +Y direction (angle •=45° to the X direction) of the corner section CR to bond the patch 12. As the result of this experiment, the generation of the wrinkle was not seen in the reinforcing fiber 14 of the patch 12 in either of the CAP section, the CURVE section and the WEB section.

Figure 1:
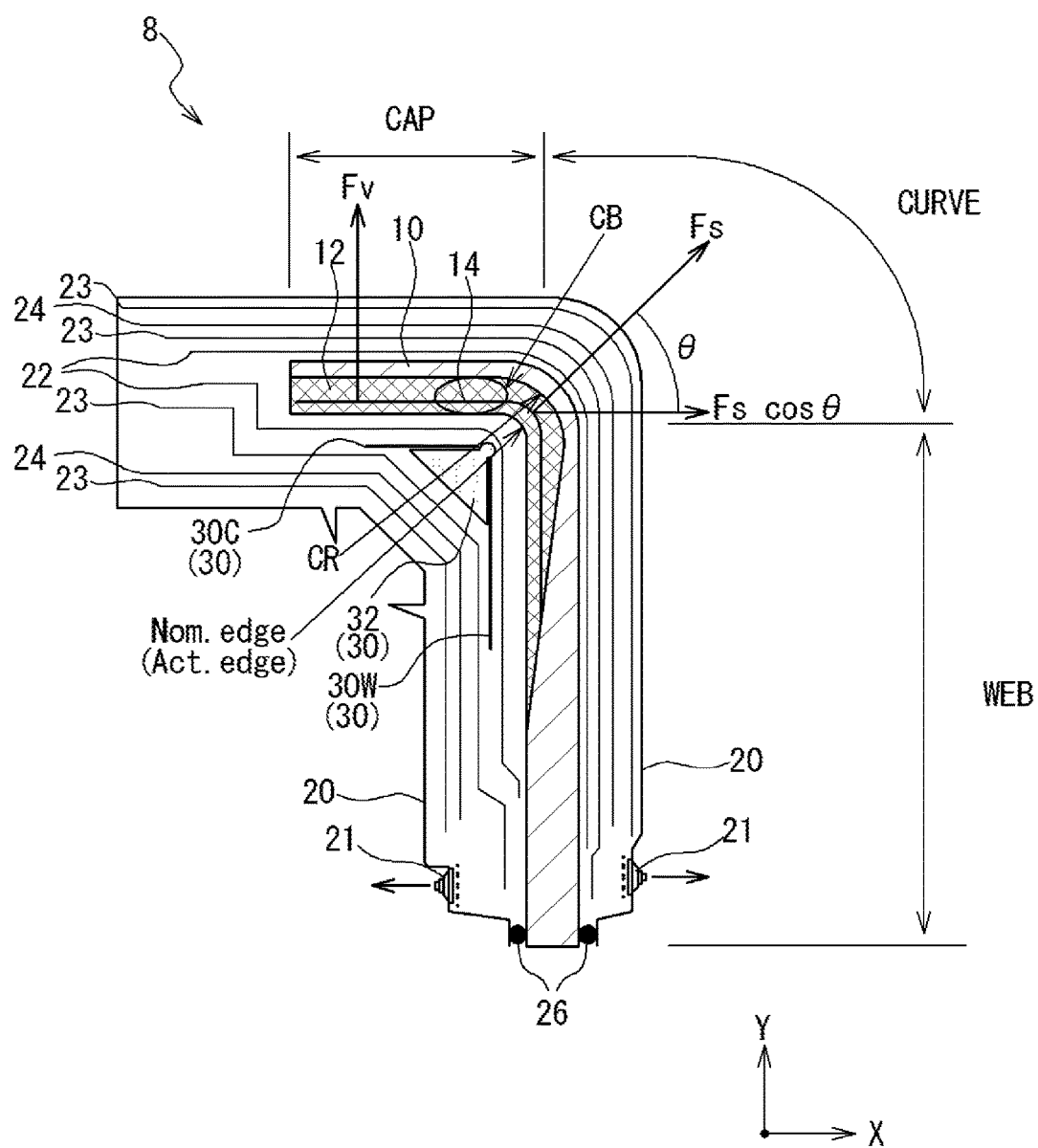
FIG. 1 is a side view showing the situation that pressure shaping is carried out by bonding a reinforcing fiber to a corner section of an object member of an L-shaped material by a bonding apparatus according to an embodiment.
Figure 2:
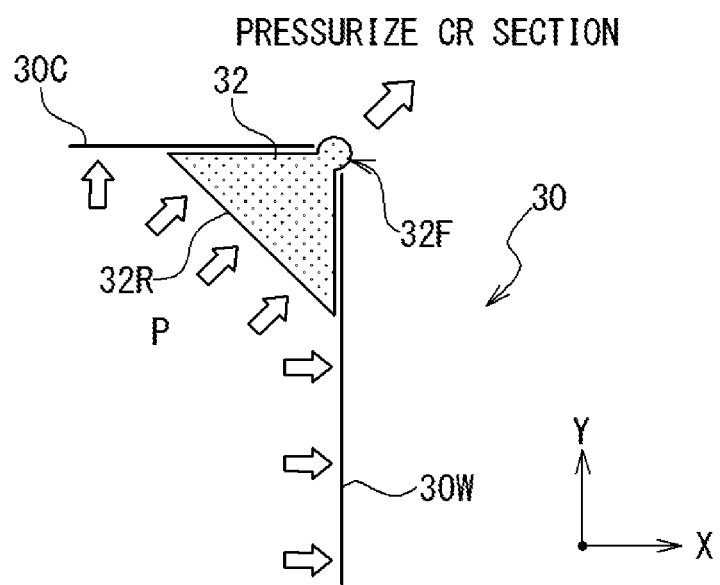
FIG. 2 is a side view showing a structural example in which an elastic pressuring body effectively pushes the corner section of the object member in the pressure shaping.

Referring to the attached drawings, the bonding apparatus according to an embodiment of the present invention will be described below. FIG. 1 is a side view showing the situation when a reinforcing fiber is bonded to the corner section of the L-shaped material as the object member 10 and is subjected to pressure shaping by using the bonding apparatus 8. FIG. 2 is a side view showing a structural example containing an elastic pressuring body 32 (pressuring block) that pressures the corner section CR of the object member 10 effectively in the pressure shaping.

First Embodiment

Referring to FIG. 1, the bonding apparatus 8 according to the first embodiment of the present invention is used when the patch 12 containing the reinforcing fiber 14 and a matrix resin is pushed and bonded to the bonded section of the corner section in the CURVE section of the object member 10. The bonding apparatus 8 has a bag member 20, a decompression port 21, mold releasing films 22, breathers 23, heater mats 24, sealant 26 and a pushing member 30. Referring to FIG. 2, the pushing member 30 has a first cowl plate 30C, a second cowl plate 30W and the elastic pressuring body 32.

For example, the object member 10 has a vertically standing WEB section and a CAP section having a predetermined angle to the WEB section. The CURVE section (the bending section) is a section between the WEB section and the CAP section. The patch 12 is bonded to the bonded section of the corner section in the CURVE section.

Note that in an embodiment shown in FIG. 1, an angle between the WEB section and the CAP section is right-angle, but the angle between the WEB section and the CAP section is not limited to the right-angle.

The bag member 20 is a member to cover the first cowl plate 30C, the second cowl plate 30W, the elastic pressuring body 32 and the patch 12 in the condition that the patch 12 is bonded to the bonded section in the corner section of the object member 10. The bag member 20 is airtight, and pushes the first cowl plate 30C, the second cowl plate 30W and the elastic pressuring body 32 to the patch 12 with the external pressure and pushes the patch 12 to the object member 10.

The decompression port 21 is a port connecting the inside of the bag member 20 and the vacuum pump (not shown). When the gas existing in a closed space inside the bag member 20 is deaerated through the decompression port 21, the inside of the bag member 20 is decompressed. Thus, the external pressure pushes the bag member 20 from outside and pushes the patch 12 to the object member 10.

The mold releasing film 22 is a member that has peel property to the matrix resin contained in the patch 12, and is used to cover the patch 12 and the object member 10 directly.

The breather 23 is a member to promote deaeration inside the bag member 20. For example, the breather 23 is a ventilation film. In the embodiment shown in FIG. 1, a plurality of the breathers 23 are arranged. The breather 23 is arranged outside the first cowl plate 30C, the second cowl plate 30W and the elastic pressuring body 32.

The heater mat 24 (heating unit) is equipment heating the patch 12. The heater mat 24 may contain a heater generating heat with the power supplied from a power supply. When the matrix resin in the patch 12 is thermosetting resin, the curing of the patch 12 and the adhesion to the object member 10 are carried out by the heating. Note that when the matrix resin of the patch 12 is a thermoplastic resin, the patch 12 is made soften through the heating, and the curing of the patch 12 and the adhesion of the object member 10 are carried out through the cooling. The heater mat 24 can adopt the structure in which temperature control is carried out independently to the CAP section, the CURVE section and the WEB section. Also, in the embodiment shown in FIG. 1, it is shown in the embodiment that the heater mats 24 are arranged on both sides of the inside of the object member 10 (the −X side, the −Y side shown in FIG. 1) and the outside thereof (the +X side, the +Y side shown in FIG. 1). However, according to the heating situation of the patch 12, the heater mat 24 may be arranged in either of the inside or the outside of the object member 10.

The sealant 26 is arranged between the bag member 20 and the object member 10 to secure airtightness between the outside of the bag member 20 and the inside of the bag member 20.

Referring to FIG. 1 and FIG. 2, the first cowl plate (a first plate section) 30C is a shaping jig to push the patch 12 to be bonded to the corner section of the object member 10 for the CAP section of the object member 10. The first cowl plate 30C extends from the corner pressuring section 32F to the −X direction (to the first direction). It is desirable to use a material having the property (elasticity and so on) that follows the shape of the CAP section of the object member 10 to an extent for the first cowl plate 30C.

The second cowl plate 30W (a second plate section) is a shaping jig to push the patch 12 to be bonded to the corner section of the object member 10 for the WEB section of the object member 10. The second cowl plate 30W extends from the corner pressuring section 32F to the −Y direction (a second direction different from the first direction in angle).

It is desirable that the second cowl plate 30W uses a material having the property (elasticity and so on) that follows the shape of the WEB section of the object member 10.

The first cowl plate 30C and the second cowl plate 30W are arranged to have different angles along the surface shape corresponding to a corner section design value of both sides that sandwiches the corner section CR of the object member 10. A gap is provided at the position where the first cowl plate 30C and the second cowl plate 30W approach most in the condition shown in FIG. 2.

In the embodiment shown in FIG. 1, the WEB section and the CAP section have a flat plate shape but may have the surface of the curve. In this case, the first cowl plate 30C and the second cowl plate 30W are used which have the curved surface shape that follows the surface shape of the WEB section and the CAP section.

The elastic pressuring body 32 is arranged on the both of the first cowl plate 30C and the second cowl plate 30W between the first cowl plate 30C and the second cowl plate 30W. The elastic pressuring body 32 protrudes from the gap between the first cowl plate 30C and the second cowl plate 30W so that a part of the elastic pressuring body 32 (corner pressuring section 32F) pushes the corner section CR of the object member 10.

The elastic pressuring body 32 has a pressure receiving surface 32R where the pushing force is given, to the bag member 20 of the part between the first cowl plate 30C and the second cowl plate 30W. Also, the elastic pressuring body 32 has the corner pressuring section 32F that protrudes from the gap between the first cowl plate 30C and the second cowl plate 30W to the direction of the corner section CR of the object member 10. The elastic pressuring body 32 is a jig for shaping that pushes the patch 12 to the bonded section of the corner section CR of the object member 10 by using the corner pressuring section 32F.

In the condition shown in FIG. 1, when the inside of the bag member 20 is deaerated and sucked, the outer surface of the bag member 20 is pushed to the direction of the object member 10 by the external pressure. At that time, the pushing force is applied to the pressure receiving surface 32R of the elastic pressuring body 32 through the breather 23 and the heater mat 24. Because the elastic pressuring body 32 has elasticity, a part of the elastic pressuring body 32 that is arranged in the range between the first cowl plate 30C and the second cowl plate 30W (the corner pressuring section 32F) protrudes from the gap between the first cowl plate 30C and the second cowl plate 30W to the direction of the corner section CR of the object member 10 with the pushing force given to the pressure receiving surface 32R.

The corner pressuring section 32F that protrudes from the gap between the first cowl plate 30C and the second cowl plate 30W pushes the patch 12 to the bonded section of the corner section CR of the object member 10 in case of curing the patch 12. By the elastic pressuring body 32 pushing the patch 12 diagonally with the force Fs for the corner section CR of the object member 10, it is easy to apply the force (Fs×cos θ) larger than the frictional force μFv of the reinforcing fiber 14 to the +X direction of the reinforcing fiber 14. By sliding the reinforcing fiber 14 to the +X direction shown in FIG. 1, the generation of the wrinkle around the corner section CR can be decreased.

It is desirable to use the material that has the characteristic of protruding from the gap between the first cowl plate 30C and the second cowl plate 30W with the pushing force given from the pressure receiving surface 32R as the material of the elastic pressuring body 32. Therefore, it is desirable to use the material having the Durometer hardness in a range of 10 to 55 for the elastic pressuring body 32. Also, because the elastic pressuring body 32 is required to transfer the heat of the heater mat 24 to the patch 12, it is desirable that the elastic material having a high thermal conductivity is good for the elastic pressuring body 32 (such as silicone rubber, nitrile rubber, ethylene propylene rubber, chloroprene rubber, styrene butadiene rubber, polybutadiene rubber, acrylonitrile butadiene rubber, butyl rubber, urethane rubber, natural rubber and so on). Also, it is desirable to add high thermal conductivity material (for example, aluminum powder, copper powder and so on) to the elastic pressuring body 32. Especially, it is desirable to add aluminum powder to the base material of silicone rubber.

The outward form of the corner pressuring section 32F in the side view shown in FIG. 2 may be a shape having a predetermined curvature or a shape based on a corner section design value (Nom.edge) after the patch 12 is bonded to the object member 10.

Also, in the side views shown in FIG. 1 and FIG. 2, the length of a part where the elastic pressuring body 32 and the first cowl plate 30C come into contact and the length of a part where the elastic pressuring body 32 and the second cowl plate 30W come into contact are possible to be 10 to 300 mm, respectively. The elastic pressuring body 32 and the first cowl plate 30C and the elastic pressuring body 32 and the second cowl plate 30W may be previously adhered together respectively. Also, the elastic pressuring body 32 and the first cowl plate 30C and the elastic pressuring body 32 and the second cowl plate 30W may be arranged only without adhering them. A gap through which the corner pressuring section 32F passes and protrudes between the first cowl plate 30C and the second cowl plate 30W can be appropriately set in the width according to the curvature of the corner section CR.

The first cowl plate 30C and the second cowl plate 30W may be formed from independent separate members, or may be configured (as a unitary structure) from one member that has the gap from which the elastic pressuring body 32 protrudes. Even when the first cowl plate 30C and the second cowl plate 30W are configured from one member, the shape of the WEB section and the CAP section of the object member 10 are desirable to have the elasticity due to which the first cowl plate 30C and the second cowl plate 30W follow the shape of the object member 10 according to the angle between the WEB section and the CAP section.

As a result that the experiment is carried out to bond the patch 12 and the object member 10 by using the bonding apparatus 8 shown in FIG. 1, the finish shape (Act.edge) of the corner section after the patch 12 is bonded to the corner section CR is approximately identical (e.g. 3.2 mm) to the corner section design value (Nom.edge) or is recessed innerwardly. Also, the generation of any wrinkle and sag is seen in the reinforcing fiber 14 inside the patch 12 shown in FIG. 1 in the CAP section (containing an improved section CB), the CURVE section, and the WEB section. From this fact, it can be determined that the pressure receiving surface 32R is pushed by the external pressure of the bag member 20 so that the part of the elastic pressuring body 32 protrudes from the gap between the first cowl plate 30C and the second cowl plate 30W to push the corner section CR of the object member 10 effectively.

Note that as the material of the reinforcing fiber 14, carbon fiber, glass fiber, organic fiber such as aramid fiber, polyparaphenylene benzobisoxazole fiber, phenol fiber, polyethylene fiber, polyvinyl alcohol fiber, metal fiber, ceramic fiber, or a combination of them can be used.

Also, as the matrix resin to be used for the patch 12, the thermoplastic resin or the thermosetting resin can be used. It is desirable to use the thermosetting resin in the present situation from the aspect of the shapability and the dynamic characteristic. As the thermosetting resin, for example, epoxy, phenol, vinyl ester, unsaturated polyester, cyanate ester, bismaleimide, benzoxazine, other resin can be used. To cure, curing agent, curing accelerator, polymerization initiator, catalyst and so on can be added. Moreover, the additive such as elastomer, and rubber can be used.

Also, as the thermoplastic resin, for example, PPS (polyphenylene sulfide), PEEK (polyether ether ketone), PEKK (polyether ketone ketone), PEK (poly ether ketone), PI (polyimide), PEI (polyether imide), PA (nylon polyamide), and so on can be used. It is desirable to use a prepreg member in which the matrix resin is impregnated in the reinforcing fiber 14 for the patch 12, but the reinforcing fiber 14 of a dry form may be used.

(Bonding Method of Patch to Object Member)

The method of bonding the patch 12 containing the reinforcing fiber 14, to the object member 10 to have the bonded section in the corner section CR by the bonding apparatus 8 will be described.

(Preparation Process)

The object member 10, the bag member 20, the decompression port 21, the mold releasing film 22, the breather 23, the heater mat 24, the sealant 26 and the pushing member 30 are first prepared (see FIG. 1). The bag member 20 having the decompression port 21 is prepared. The pushing member 30 having the first cowl plate 30C, the second cowl plate 30W and the elastic pressuring body 32 is prepared. Also, the corner pressuring section 32F of the pushing member 30 has the surface shape corresponding to the corner section design value (Nom.edge) after the patch 12 is bonded is prepared.

(Pretreatment Process)

Next, a cut-out process is carried out to the bonded section of the corner section of the object member 10 according to need, to remove a damaged part, an unnecessary part for the pretreatment.

(Arranging Process)

Next, the patch 12 containing the reinforcing fiber 14 is arranged to come into contact with the bonded section of the corner section CR of the object member 10. Then, the mold releasing film 22 is arranged on the patch 12 and the pushing member 30, the breather 23, the heater mat 24 and so on are appropriately arranged.

(Closed Space Forming Process)

The sealant 26 is arranged, and the bonded section of the object member 10, the patch 12, the mold releasing film 22, the pushing member 30, the breather 23 and the heater mat 24 are covered by the bag member 20 so as to form the closed space containing the bonded section of the object member 10.

(Deaerating Process)

When the closed space is formed to surround the bonded section, the vacuum pump is connected with the decompression port 21 to suck and deaerate gas in the closed space. Then, the first cowl plate 30C pushes the patch 12 for the CAP section of the object member 10 by the external pressure. In the same way, the second cowl plate 30W pushes the patch 12 for the WEB section of the object member 10. Then, the pushing force is applied to the pressure receiving surface 32R of the elastic pressuring body 32.

(Pushing Process to Corner Section CR)

When the pushing force is applied to the pressure receiving surface 32R of the elastic pressuring body 32, the corner pressuring section 32F of the elastic pressuring body 32 protrudes from the gap between the first cowl plate 30C and the second cowl plate 30W to the direction of the corner section CR of the object member 10. Then, the corner pressuring section 32F pushes the patch 12 to the bonded section of the corner section CR of the object member 10. Because the reinforcing fiber 14 contained in the patch 12 is pulled for the corner section CR, the generation of the wrinkle in the improved section CB around the corner section CR can be decreased.

(Heating Process)

During a predetermined time, the heater mat 24 is turned on to heat the object member 10 and the patch 12. When a thermosetting resin is used for the matrix resin of the patch 12, the thermosetting resin is cured in case of heating to bond the object member 10 and the patch 12 and shape them. When a thermoplastic resin is used for the matrix resin of the patch 12, the thermoplastic resin is cured in case of cooling after the heating to bond the object member 10 and the patch 12 and shape them.

(Removing Process of Bag Member 20)

If the shaping ends, the bag member 20, the sealant 26, the mold releasing film 22, the pushing member 30, the breather 23 and the heater mat 24 are removed. In this way, the bonding of the patch 12 to the object member 10 is carried out.

Second Embodiment

In the first embodiment, the embodiment in which the corner section CR of the object member 10 is pushed using the elastic pressuring body 32 has been described. On the other hand, in a second embodiment, an embodiment in which the corner section CR of the object member 10 is pushed by using a pressuring section 30F that is formed in a corner section of the pushing member 30P will be described.

Figure 3:
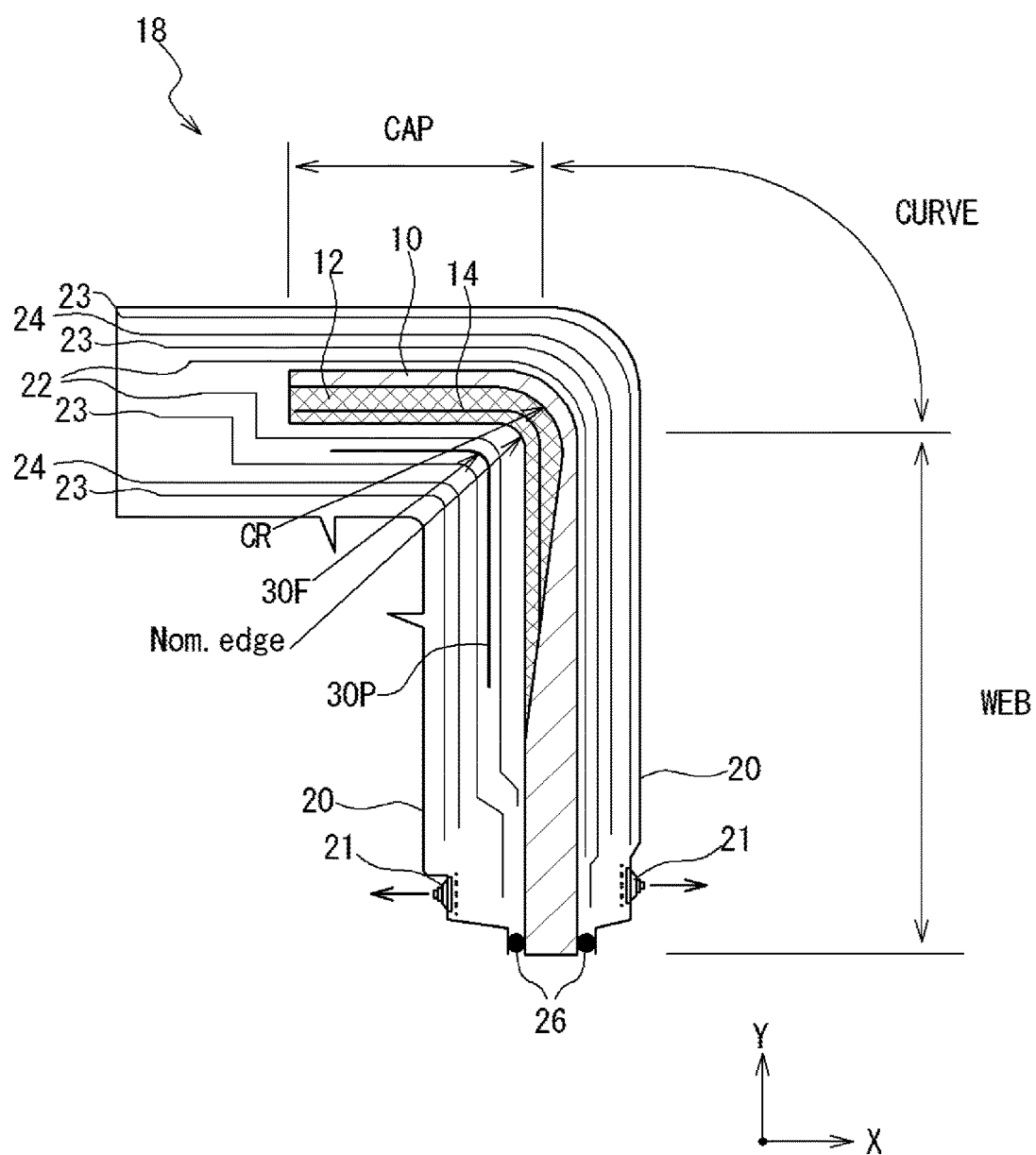
FIG. 3 is a side view showing the situation that the pressure shaping is carried out by bonding the reinforcing fiber to the corner section of the object member of the L-shaped material by the bonding apparatus according to an embodiment.

FIG. 3 is a side view showing the situation that a reinforcing fiber is bonded by the bonding apparatus 18 to the corner section of the object member 10 of the L-shaped-type material to carry out pressuring shape. Note that a part having the function identical with the part has been described with reference to FIG. 1 is assigned with the same reference numeral, and the description is omitted.

Referring to FIG. 3, the bonding apparatus 18 is used to bond the patch 12 containing the reinforcing fiber 14 and the matrix resin to the bonded section caused in the corner section of the CURVE section of the object member 10. The bonding apparatus 18 has the bag member 20, the decompression port 21, the mold releasing film 22, the breather 23, the heater mat 24, the sealant 26 and the pushing member 30P.

(Pushing Member 30P)

As shown in FIG. 3, the pressuring section 30F is formed in the corner section of the pushing member 30P. The pushing member 30P has a first plate section extending along the CAP section from the pressuring section 30F to the −X direction (a first direction) and a second plate section extending along the WEB section from the pressuring section 30F to the second direction different from the first direction (a −Y direction).

The first plate section of the pushing member 30P biases the patch 12 for the CAP section of the object member 10. The pressuring section 30F of the pushing member 30P biases the patch 12 for the bonded section of the corner section CR of the object member 10. The second plate section of the pushing member 30P biases the patch 12 for the WEB section of the object member 10. It is desirable to use the material having a nature (the elasticity and so on) that follows the shape of the object member 10 for the pushing member 30P.

(Biasing Unit 40)

Next, with reference to FIG. 4 to FIG. 6, the embodiment in which the pressure shaping of the pushing member 30P shown in FIG. 3 is carried out by using the biasing unit 40 in addition to the external pressure to the bag member 20 will be described. The biasing unit 40 biases the pushing member 30P for the patch 12 and the bonded section of the object member 10.

Figure 4:
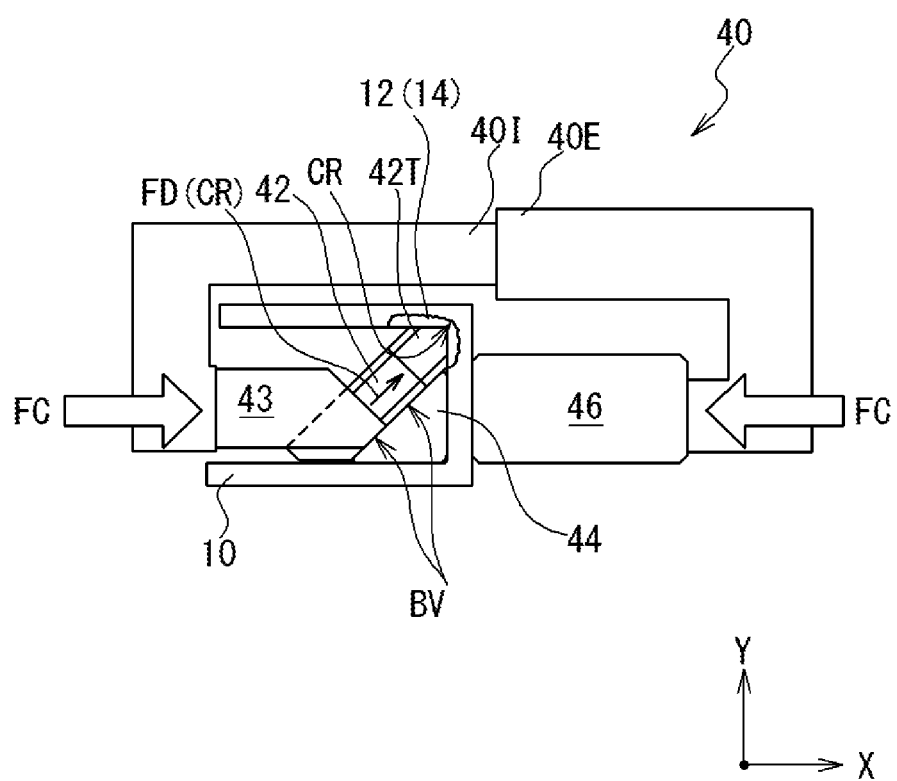
FIG. 4 is a side view showing that a pressuring section pushes a patch to a bonded section by using clamp force generated by a biasing section in the embodiment.

FIG. 4 is a side view showing the embodiment in which the pressuring section 42T pushes the patch 12 to the bonded section by using the clamp force FC produced by the biasing unit 40. FIG. 5 is a front view when the biasing unit 40 shown in FIG. 4 is observed from the −X direction. FIG. 6 is a cross sectional view of the biasing unit 40 shown in FIG. 5 along the B-B line.

Figure 5:
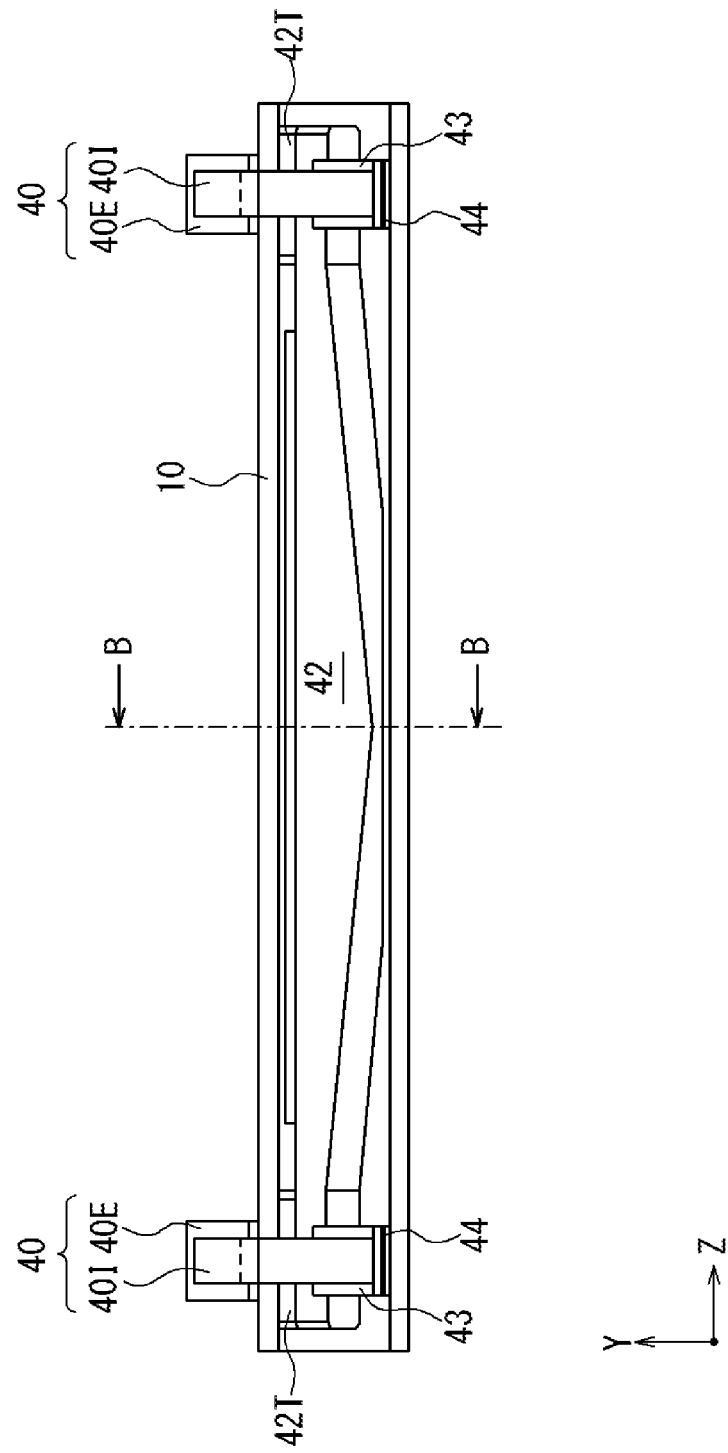
FIG. 5 is a front view showing an observation result of the biasing section shown in FIG. 4 from a −X direction.
Figure 6:
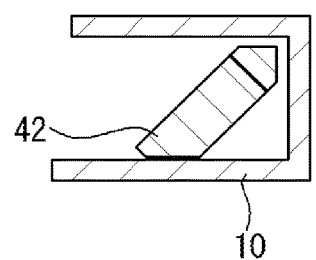
FIG. 6 is a sectional view showing the biasing section along the B-B arrow line shown in FIG. 5.

As shown in FIG. 4 to FIG. 6, the biasing unit 40 has a first biasing force giving section 40I, a second biasing force giving section 40E and a biasing force giving member 42. The tip of the bias force giving member 42 has the pressuring section 42T. Also, the biasing unit 40 has an inclination block 44, a sliding block 43 and a back block 46.

The first biasing force giving section 40I and the second biasing force giving section 40E apply the clamp force FC to clamp the biasing force giving member 42 and the object member 10 through the sliding block 43 and the back block 46.

The inclination block 44 shown in FIG. 4 is a triangle pillar that has the section of the right triangle. Note that right triangle includes an approximation of the right triangle. The surface of the inclination block 44 along the X axis and the surface thereof along the Y axis orthogonalize to each other. These two surfaces come into contact with the bonded section of the object member 10. The slope of the inclination block 44 (a surface inclined with respect to the X and the Y axis) is a sliding slope BV to make the sliding block 43 and the biasing force giving member 42 slide to a third direction (a direction to which the pressuring section 42T is biased for the corner section CR).

The sliding block 43 receives the clamp force FC in the +X direction to slide to the direction of the corner section CR (the third direction) along the sliding slope BV of the inclination block 44. As a result, the clamp force FC is converted to the pressuring force FD. The pressuring force FD is communicated to the biasing force giving member 42.

The biasing force giving member 42 receives the pressuring force FD from the inclination block 44 to slide to the direction of the corner section CR and the pressuring section 42T pushes the patch 12 to the object member 10 through the bag member 20 and so on (reference to FIG. 3). Note that a force to the inclination direction of the sliding slope BV (the third direction) contains a component force that biases a first plate section in the pushing member 30P for the patch 12 and a component force that biases a second plate section in the pushing member 30P for the patch 12.

The back block 46 is arranged on the back side of the object member 10 to the bonded section. The back block 46 receives the clamp force FC to the −X direction from the second biasing force giving section 40E to communicate the clamp force FC to the object member 10.

The clamp force FC produced by the first biasing force giving section 40I and the second biasing force giving section 40E is converted into the pressuring force FD, that biases the patch 12 to the bonded section of the object member 10. Thus, the pressure shaping can be carried out.

As shown in the embodiment of FIG. 5, when the object member 10 is long in a longitudinal direction, the first biasing force giving section 40I, the second biasing force giving section 40E, the sliding block 43, the inclination block 44 of the biasing unit 40 are arranged in either end of the object member 10, and the pressuring force FD can be applied to the direction of the corner section CR of the object member 10 by using the biasing force giving member 42. Note that FIG. 6 is a diagram showing the arrangement of the object member 10 and the biasing force giving member 42 in the center section of the object member 10.

(Bonding Method of Patch 12 to Object Member 10)

Next, a method of bonding the patch 12 containing the reinforcing fiber 14 to the object member 10 having the bonded section of the corner section CR, by the bonding apparatus 18 and the biasing unit 40 will be described.

(Preparing Process)

First, the object member 10, the bag member 20, the decompression port 21, the mold releasing film 22, the breather 23, the heater mat 24, the sealant 26, and the pushing member 30P and the biasing unit 40 are prepared (reference to FIG. 3 to FIG. 7). The bag member 20 should be prepared to have the decompression port 21. As the shape containing the pressuring section 30F of the pushing member 30P, the object member 10 and a member having the surface shape corresponding to the corner section design value (Nom.edge) after the patch 12 is bonded.

(Pretreatment Process)

Next, the removing process is carried out to the bonded section of the corner of the object member 10 as a pretreatment process according to need, to remove a damaged part or an unnecessary part.

(Arranging Process)

Next, as shown in FIG. 3, the patch 12 containing the reinforcing fiber 14 is arranged to come into contact with the bonded section of the corner section CR of the object member 10. Then, the mold releasing film 22 is arranged on the patch 12 and the pushing member 30P, the breather 23, the heater mat 24 and so on are appropriately arranged.

(Closed Space Forming Process)

By arranging the sealant 26, the bonded section of the object member 10, the patch 12, the mold releasing film 22, the pushing member 30P, the breather 23 and the heater mat 24 are covered by the bag member 20 so as to form the closed space containing the bonded section of the object member 10.

(Deaerating Process)

After the closed space is formed to surround the bonded section, the vacuum pump is connected to the decompression port 21 to suck and deaerate gas in the closed space. Then, the pushing member 30P pushes the patch 12 for the CAP section and the WEB section of the object member 10 with the external pressure.

(Pushing Process to Corner Section CR)

Next, as shown in FIG. 4 to FIG. 6, the inclination block 44 and the biasing force giving member 42 are arranged for the object member 10 outside the closed space formed by the bag member and the object member 10. At this time, the pressuring section 42T is arranged to pressure the patch 12 for the corner section CR of the object member 10. Then, the sliding block 43 and the back block 46 are arranged. Next, the first biasing force giving section 40I and the second biasing force giving section 40E are arranged. Then, the clamp force FC is applied to the sliding block 43 and the back block 46. Then, the biasing force giving member 42 moves along the sliding slope BV so that the pressuring section 42T pushes the patch 12 for the corner section CR of the object member 10. Then, because the reinforcing fiber 14 contained in the patch 12 is pulled for the corner section CR, the generation of the wrinkle around the corner section CR can be suppressed.

(Heating Process)

During a predetermined time, the heater mat 24 is turned on to heat the object member 10 and the patch 13.

(Removing Process of Bag Member 20)

When the shaping ended, the biasing unit 40, the bag member 20, the sealant 26, the mold releasing film 22, the pushing member 30P, the breather 23 and the heater mat 24 are removed. In this way, the bonding of the patch 12 to the object member 10 ends.

(Application Example to Other Object Member)

Figure 7:
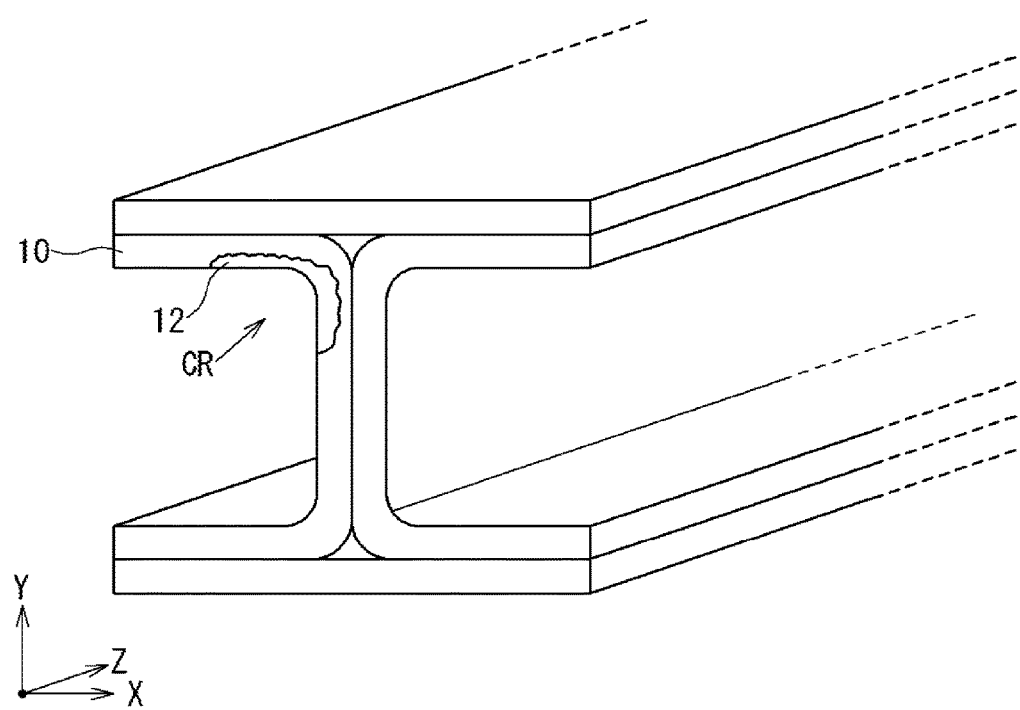
FIG. 7 is a diagram showing the shape of another object member to which the bonding apparatus of the embodiment can be applied.

An application example to the other object member is shown in FIG. 7. The bonding of the patch 12 to the object member 10 by using the bonding apparatus according to the present invention can be applied to the manufacture and the repair of the bonded section in the corner section CR of the H-shaped material shown in FIG. 7, in addition to the bonded sections of the L-shaped material shown in FIG. 1 and FIG. 3, and a ⊃ character shaped material shown in FIG. 4 to FIG. 6. Note that in the above-mentioned embodiments, the embodiments in which the patch 12 for repair is bonded to the bonded section of the object member 10 have been described. However, the embodiment may be used to manufacture various members or an apparatuses, by applying the patch to the object member having the bonded section.

In the above, referring to the embodiments, the bonding apparatus, a kit, a pushing member, a biasing unit and a bonding method according to the present invention have been described. However, the bonding apparatus, the kit, the pushing member, and the biasing unit and the bonding method according to the present invention are not limited to the above embodiments. Various changes or modifications can be carried out in the above embodiment. The technical matter mentioned in the above embodiment and the other technical matter mentioned in the above other embodiment can be combined. Also, the present invention can be applied to an RTM (Resin Transfer Molding) method and a VaRTM (Vacuum-assisted Resin Transfer Molding) method, a double vacuum debulking method, an autoclave method, and other shaping methods.

As understood from the above description, the pushing member is a member that pushes the patch containing a reinforcing fiber to the bonded section of the corner section of the object member. The pushing member may have a first plate section, a second plate section and an elastic pressuring body. The first plate section and the second plate section are arranged at angles different from each other along the shapes of the object member that sandwich the corner section of the object member. A gap is provided in the position corresponding to the corner section between the first plate section and the second plate section. The elastic pressuring body is arranged on the first plate section and the second plate section between the first plate section and the second plate section. The elastic pressuring body has the pressure receiving surface given with the pushing force between the first plate section and the second plate section on the side opposite to the gap. The elastic pressuring body has a pressuring section that receives the pushing force, to protrude from the gap to the direction of the corner section of the object member, so that the patch is pushed to the bonded section.

Also, the biasing section pushes the patch containing the reinforcing fiber to the bonded section of the corner section of the object member. The biasing section has a first biasing force giving section, a second biasing force giving section and a biasing force giving member. The biasing force giving member has a pressuring section at the tip. The first biasing force giving section and the second biasing force giving section apply the clamp force with which the biasing force giving member and the object member are clamped. The biasing force giving member extends to the direction of the corner section of the object member based on the clamp force so that the pressuring section pushes the patch to the bonded section.

At this time, the biasing section may further include an inclination block, a sliding block and a back block. The inclination block, the sliding block and the biasing force giving member are arranged on the side of the bonded section of the object member and the back block is arranged on the back side of the bonded section of the object member. The inclination block has a sliding slope to make the sliding block and the biasing force giving member slide to a third direction. The sliding block converts the clamp force in the direction different from the third direction into the pressuring force in the third direction by sliding along the sliding slope, and communicates the converted force to the biasing force giving member. The biasing force giving section slides along the sliding slope, so that the pressuring section pushes the patch to the bonded section.

The invention claimed is:

1. A bonding apparatus configured to bond a patch formed of a reinforced fiber composite material, to an object member formed of a reinforced fiber composite material, comprising:

a pushing member disposed to push the patch which has been arranged on a bonded section of a corner section of the object member to the bonded section of the corner section of the object member in response to an application force;

a biasing section disposed to give the application force to the pushing member;

a heating unit disposed to heat the patch; and a bag member disposed to cover a surface portion containing the bonded section of the object member, the patch, the heating unit and pushing member, wherein an inside of the bag member is decompressed, and the biasing section is arranged outside a closed space formed from the bag member and the object member to bias the pushing member for the patch, wherein the biasing section comprises:

a giving member configured to give the application force to the corner section and a part of the object member extending from the corner section;

an inclination block; and a sliding block, wherein the inclination block has a sliding slope along which the sliding block and the giving member are configured to slide, and wherein the sliding block is configured to slide along the sliding slope to convert a clamp force in a direction different from a direction of the corner section to the application force in the direction of the corner section to transfer to the giving member.

2. The bonding apparatus according to claim 1, wherein the pushing member comprises:

a first plate section disposed to extend along the object member from the corner section to a first direction; and a second plate section disposed to extend along the object member from the corner section to a second direction different from the first direction, wherein the object member is pushed with the first plate section and the second plate section in response to the application force.

3. The bonding apparatus according to claim 1, wherein the pushing member comprises:

a first plate section disposed to extend along the object member from the corner section to a first direction;

a second plate section disposed to extend along the object member from the corner section to a second direction different from the first direction; and an elastic pressuring body disposed to push the corner section through a gap between the first plate section and the second plate section, and wherein the elastic pressuring body has a pressure receiving surface to which the application force is given, and a pressuring section which pushes the corner section through the gap between the first plate section and the second plate section in response to the application force.

4. The bonding apparatus according to claim 3, wherein the elastic pressuring body has Durometer hardness in a range of 10 to 55.

5. The bonding apparatus according to claim 3, wherein the elastic pressuring body is added with a high thermal conductivity material.

6. The bonding apparatus according claim 1, further comprising:

a heating unit disposed to heat the patch; and a bag member disposed to cover a surface portion containing the bonded section of the object member, the patch, the heating unit, and the pushing member, wherein the inside of the bag member is decompressed, and the application force is an atmosphere pressure that biases the pushing member toward a direction of the corner section through decompressed bag member.

7. The bonding apparatus according to claim 1, wherein the inclination block, the sliding block and the giving member are arranged on a side of the bonded section of the object member, and wherein the biasing section further comprises a back block arranged on a back side of the bonded section of the object member to apply the clamp force.

8. A bonding method of bonding a patch formed of a reinforced fiber composite material to an object member formed of a reinforced fiber composite material, the method comprising:

preparing a bag member having a decompression port, a heating unit and a pushing member which pushes a surface of the patch;

arranging the patch in a bonded section of a corner section of the object member;

disposing the pushing member toward the bonded section of the corner section;

forming a closed space from the bag member and the object member, wherein the patch, the heating unit which heats the patch, and the pushing member are in the closed space;

decompressing an inside of the closed space;

pushing the patch to the bonded section of the corner section by the pushing member through the bag member such that the patch is bonded to the bonded section of the corner section of the object member; and bonding the patch to the object member by heating the object member and the patch by the heating unit;

wherein said pushing comprises arranging a basing unit outside the closed space formed from the bag member and the object member to bias the pushing member toward the patch, wherein the biasing unit comprises a giving member configured to give the application force to the corner section and a part of the object member extending from the corner section, wherein the biasing unit further comprises an inclination block and a sliding block, wherein the inclination block has a sliding slope along which the sliding block and the giving member are configured to slide, and wherein the sliding block is configured to slide along the sliding slope to convert a clamp force (FC) in a direction different from a direction of the corner section to the application force in the direction of the corner section to transfer to the giving member.

* * * * *